(12) United States Patent
Kwak et al.

(10) Patent No.: US 10,673,598 B2
(45) Date of Patent: Jun. 2, 2020

(54) METHOD AND APPARATUS FOR TRANSMITTING AND RECEIVING DOWNLINK DATA

(71) Applicant: LG Electronics Inc., Seoul (KR)

(72) Inventors: Kyuhwan Kwak, Seoul (KR); Seungmin Lee, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/404,038

(22) Filed: May 6, 2019

(65) Prior Publication Data

US 2019/0342058 A1    Nov. 7, 2019

Related U.S. Application Data

(60) Provisional application No. 62/667,601, filed on May 6, 2018.

(51) Int. Cl.
*H04L 5/00* (2006.01)
*H04W 72/04* (2009.01)
*H04W 76/27* (2018.01)
*H04W 76/11* (2018.01)
*H04W 72/12* (2009.01)

(52) U.S. Cl.
CPC ......... *H04L 5/0082* (2013.01); *H04W 72/042* (2013.01); *H04W 72/1273* (2013.01); *H04W 76/11* (2018.02); *H04W 76/27* (2018.02)

(58) Field of Classification Search
CPC ..... H04L 5/0082; H04W 76/11; H04W 76/27; H04W 72/042; H04W 72/1273
See application file for complete search history.

(56) References Cited

U.S. PATENT DOCUMENTS

| 2012/0176957 | A1* | 7/2012 | Chen ................. H04B 7/155 370/315 |
| 2014/0177487 | A1* | 6/2014 | Hammarwall ...... H04W 72/042 370/280 |

(Continued)

FOREIGN PATENT DOCUMENTS

| WO | WO2015046830 | 4/2015 |
| WO | WO2015064924 | 5/2015 |
| WO | WO2017100556 | 6/2017 |

OTHER PUBLICATIONS

ZTE, Sanechips, "Discussion on PDSCH repetition for LTE URLLC," R1-1803962, 3GPP TSG RAN WG1 Meeting #92bis, Sanya, China, Apr. 16-20, 2018, 4 pages.

(Continued)

*Primary Examiner* — Mehmood B. Khan
(74) *Attorney, Agent, or Firm* — Fish & Richardson P.C.

(57) ABSTRACT

A method of receiving, by a user equipment (UE) that is configured to operate in transmission mode 10, downlink data in a wireless communication system. The method includes: receiving, in a transmission time interval (TTI), downlink control information (DCI) that includes resource element (RE) mapping information. The method also includes receiving, in a plurality of TTIs subsequent to the TTI in which the DCI was received, repeated transmissions of the downlink data to which the RE mapping information has been applied.

15 Claims, 15 Drawing Sheets

(56) References Cited

U.S. PATENT DOCUMENTS

| | | | |
|---|---|---|---|
| 2015/0237644 A1* | 8/2015 | Golitschek Edler von Elbwart | H04B 7/2656 370/329 |
| 2015/0358134 A1* | 12/2015 | Hammarwall | H04L 1/001 370/330 |
| 2016/0037550 A1* | 2/2016 | Barabell | H04W 72/1263 455/450 |
| 2017/0135084 A1* | 5/2017 | Kuchibhotla | H04L 5/0007 |
| 2017/0264414 A1* | 9/2017 | Froberg Olsson | H04B 7/0413 |
| 2017/0332386 A1* | 11/2017 | Li | H04L 1/1812 |
| 2018/0049169 A1* | 2/2018 | Lin | H04L 5/0007 |
| 2018/0092072 A1* | 3/2018 | Babaei | H04L 5/0053 |
| 2018/0098337 A1* | 4/2018 | Lee | H04W 72/042 |
| 2018/0220345 A1* | 8/2018 | Moon | H04B 7/088 |
| 2018/0295651 A1* | 10/2018 | Cao | H04W 76/27 |
| 2018/0368122 A1* | 12/2018 | Kuchibhotla | H04W 72/085 |
| 2019/0075582 A1* | 3/2019 | Kim | H04L 27/2613 |
| 2019/0141703 A1* | 5/2019 | Gupta | H04L 5/0051 |
| 2019/0181991 A1* | 6/2019 | Andgart | H04W 72/042 |

OTHER PUBLICATIONS

Ericsson, "TP on sTTI terminology 36.213," R1-1802929, 3GPP TSG-RAN WG1 Meeting #92, Athens, Greece, Feb. 26-Mar. 2, 2018, 225 pages.

Huawei, HiSilicon, "Support of 60 kHz subcarrier spacing," R1-1801783, 3GPP TSG RAN WG1 Meeting #92, Athens, Greece, Feb. 26-Mar. 2, 2018, 13 pages.

Ericsson, "On PDCCH Repetition for URLLC," R1-1803921, 3GPP TSG-RAN WG1 Meeting #92b, Sanya, P.R. China, Apr. 16-20, 2018, 5 pages.

LG Electronics, "Discussion on PDCCH repetition for URLLC," R1-1804571, 3GPP TSG RAN WG1 Meeting #92bis, Sanya, China, Apr. 16-20, 2018, 4 pages.

LG Electronics, "Discussion on compact DCI format design," R1-1804570, 3GPP TSG RAN WG1 Meeting #92bis, Sanya, China, Apr. 16-20, 2018, 6 pages.

Taiwan Office Action in Taiwan Application No. 108115476, dated Dec. 18, 2019, 18 pages (with English translation).

* cited by examiner

CONTROL-PLANE PROTOCOL STACK

USER-PLANE PROTOCOL STACK

1 TX or 2 TX

4 TX

METHOD AND APPARATUS FOR TRANSMITTING AND RECEIVING DOWNLINK DATA

CROSS-REFERENCE TO RELATED APPLICATIONS

This application claims the benefit of an earlier filing date and right of priority to U.S. Provisional Application No. 62/667,601, filed on May 6, 2018, the contents of which are hereby incorporated by reference as if fully set forth herein.

TECHNICAL FIELD

The present disclosure generally relates to transmitting and receiving downlink data in a wireless communication system.

BACKGROUND

As wireless communication technology faces increasing demands and expectation of users and service providers, new technological evolution is being developed to achieve future competitiveness. Specifically, techniques are being developed to achieve cost reduction per bit, increased service availability, flexible use of frequency bands, a simplified structure, an open interface, and appropriate power consumption.

SUMMARY

One general aspect of the present disclosure includes a method of receiving, by a user equipment (UE) configured to operate in transmission mode 10, downlink data in a wireless communication system, the method including: receiving, in a transmission time interval (TTI), downlink control information (DCI) that includes resource element (RE) mapping information; and receiving, in a plurality of TTIs subsequent to the TTI in which the DCI was received, repeated transmissions of the downlink data to which the RE mapping information has been applied. Other embodiments of this aspect include corresponding computer systems, apparatus, and computer programs recorded on one or more computer storage devices, each configured to perform the actions of the methods.

Implementations may include one or more of the following features. The method further including: decoding the repeated transmissions of the downlink data that were received in the plurality of TTIs, based on the RE mapping information in the DCI that was received in the TTI. The method where receiving the repeated transmissions of downlink data includes: receiving the downlink data which is repeatedly transmitted in the plurality of TTIs by a same transmission point (TP). The method where the plurality of TTIs are short TTIs. The method where the DCI is related to cell-radio network temporary identifier (C-RNTI)-based data scheduling. The method where the RE mapping information is commonly applied to all of the repeated transmissions of the downlink data in the plurality of TTIs. The method where the plurality of TTIs are consecutive in time. Implementations of the described techniques may include hardware, a method or process, or computer software on a computer-accessible medium.

Another general aspect includes an apparatus configured to operate in transmission mode 10, the apparatus including: at least one processor; and at least one memory operably connectable to the at least one processor and storing instructions that, when executed by the at least one processor, perform operations including: receiving, in a transmission time interval (TTI), downlink control information (DCI) that includes resource element (RE) mapping information; and receiving, in a plurality of TTIs subsequent to the TTI in which the DCI was received, repeated transmissions of downlink data to which the RE mapping information has been applied. Other embodiments of this aspect include corresponding computer systems, apparatus, and computer programs recorded on one or more computer storage devices, each configured to perform the actions of the methods.

Implementations may include one or more of the following features. The apparatus where the operations further include: decoding the repeated transmissions of the downlink data that were received in the plurality of TTIs, based on the RE mapping information in the DCI that was received in the TTI. The apparatus where receiving the repeated transmissions of downlink data includes: receiving the downlink data which is repeatedly transmitted in the plurality of TTIs by a same transmission point (TP). The apparatus where the plurality of TTIs are short TTIs. The apparatus where the DCI is related to cell-radio network temporary identifier (C-RNTI)-based data scheduling. The apparatus where the RE mapping information is commonly applied to all of the repeated transmissions of the downlink data in the plurality of TTIs. The apparatus where the plurality of TTIs are consecutive in time. Implementations of the described techniques may include hardware, a method or process, or computer software on a computer-accessible medium.

Another general aspect includes a method of transmitting downlink data by a base station (BS) operating based on transmission mode 10 in a wireless communication system, the method including: transmitting, in a transmission time interval (TTI), downlink control information (DCI) that includes resource element (RE) mapping information; and transmitting, in a plurality of TTIs subsequent to the TTI in which the DCI was received, repeated transmissions of the downlink data to which the RE mapping information has been applied. Other embodiments of this aspect include corresponding computer systems, apparatus, and computer programs recorded on one or more computer storage devices, each configured to perform the actions of the methods.

Another general aspect includes a user equipment (UE) configured to operate in transmission mode 10, the UE including: at least one transceiver; at least one processor; and at least one computer memory operably connectable to the at least one processor and storing instructions that, when executed by the at least one processor, perform operations including: receiving, through the at least one transceiver and in a transmission time interval (TTI), downlink control information (DCI) that includes resource element (RE) mapping information; and receiving, through the at least one transceiver and in a plurality of TTIs subsequent to the TTI in which the DCI was received, repeated transmissions of the downlink data to which the RE mapping information has been applied. Other embodiments of this aspect include corresponding computer systems, apparatus, and computer programs recorded on one or more computer storage devices, each configured to perform the actions of the methods.

Another general aspect includes a base station (BS) configured to operate based on transmission mode 10, the BS including: at least one transceiver; and at least one processor; and at least one computer memory operably connectable to the at least one processor and storing instructions that, when executed by the at least one processor, perform operations including: transmitting, through the at least one transceiver and in a transmission time interval (TTI), downlink control information (DCI) that includes resource element (RE) mapping information; and transmitting, through the at least one transceiver and in a plurality of TTIs subsequent to the TTI in which the DCI was received, repeated transmissions of the downlink data to which the RE mapping information has been applied. The base station also includes Other embodiments of this aspect include corresponding computer systems, apparatus, and computer programs recorded on one or more computer storage devices, each configured to perform the actions of the methods.

It is to be understood that both the foregoing general description and the following detailed description of the present disclosure are exemplary and explanatory and are intended to provide further explanation of the disclosure as claimed.

DETAILED DESCRIPTION

The present disclosure generally relates to transmitting and receiving downlink data, and more particularly, to a method and apparatus for transmitting and receiving data which is repeatedly transmitted in transmission mode (TM) 10.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system. In addition, while the embodiments of the present disclosure are described in the context of frequency division duplexing (FDD), they are also readily applicable to half-FDD (H-FDD) or time division duplexing (TDD) with some modifications.

A brief description will be given of an example of a wireless communication system in which implementations of the present disclosure may be applied. In some implementations, the wireless system may be compatible with a 3rd generation partnership project long term evolution (3GPP LTE) system.

Figure 1:
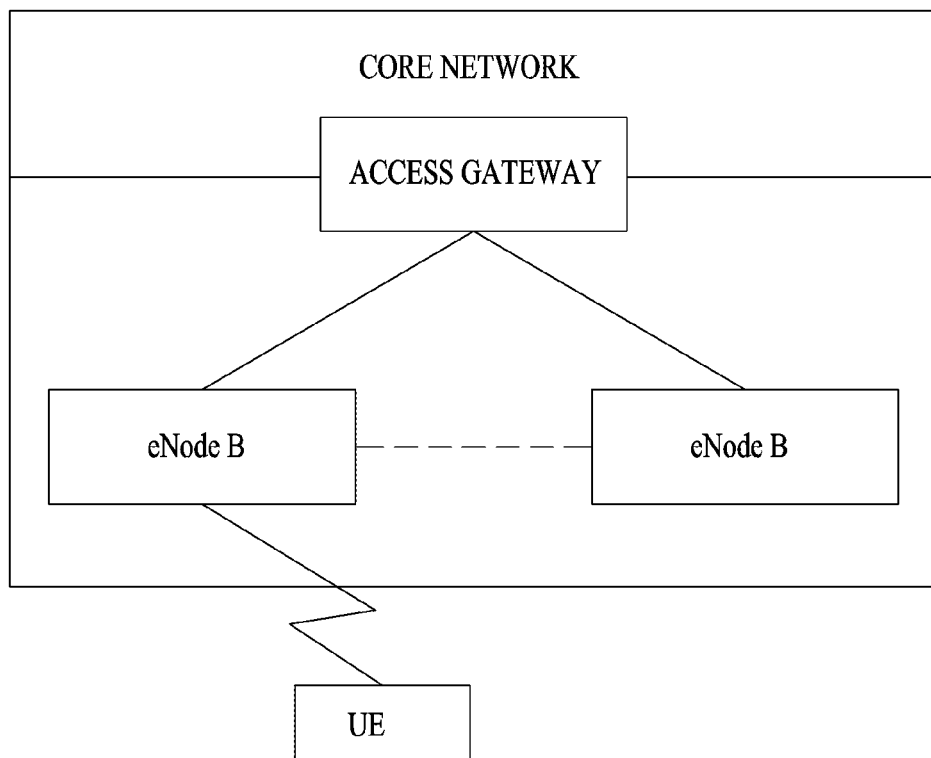
FIG. 1 illustrates an example of a wireless communication system.

FIG. 1 illustrates an example of a configuration of a wireless communication system. In some scenarios, this example may be used to implement an evolved universal mobile telecommunications system (E-UMTS) network.

The E-UMTS system is an evolution of a UMTS system. E-UMTS is also referred to as an LTE system. Details of the technical specifications of UMTS and E-UMTS can be found in Release 7 and Release 8 of "3rd Generation Partnership Project; Technical Specification Group Radio Access Network", respectively.

Referring to FIG. 1, the E-UMTS system includes a user equipment (UE), an evolved Node B (eNode B or eNB), and an access gateway (AG) which is located at an end of an evolved UMTS terrestrial radio access network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides downlink (DL) or uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, hybrid automatic repeat request (HARQ) information, etc., by transmitting DL scheduling information to the UE. Regarding UL data, the eNB notifies a particular UE of a time-frequency area in which the UE can transmit data, a coding scheme, a data size, HARQ information, etc., by transmitting UL scheduling information to the UE. An interface for transmitting user traffic or control traffic may be defined between eNBs. A core network (CN) may include an AG and a network node for user registration of UEs. The AG manages the mobility of UEs on a tracking area (TA) basis. A TA includes a plurality of cells.

Figure 2A:
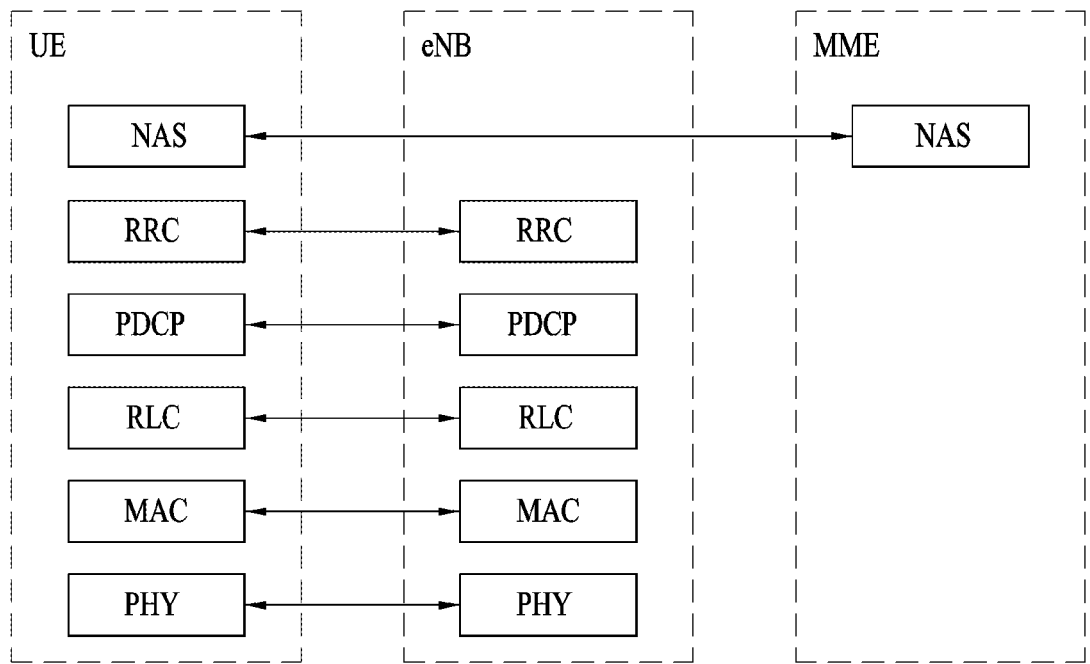
FIGS. 2A and 2B illustrate an example of a control-plane protocol stack and a user-plane protocol stack in a radio interface protocol architecture between a user equipment (UE) and a radio access network.
Figure 2B:
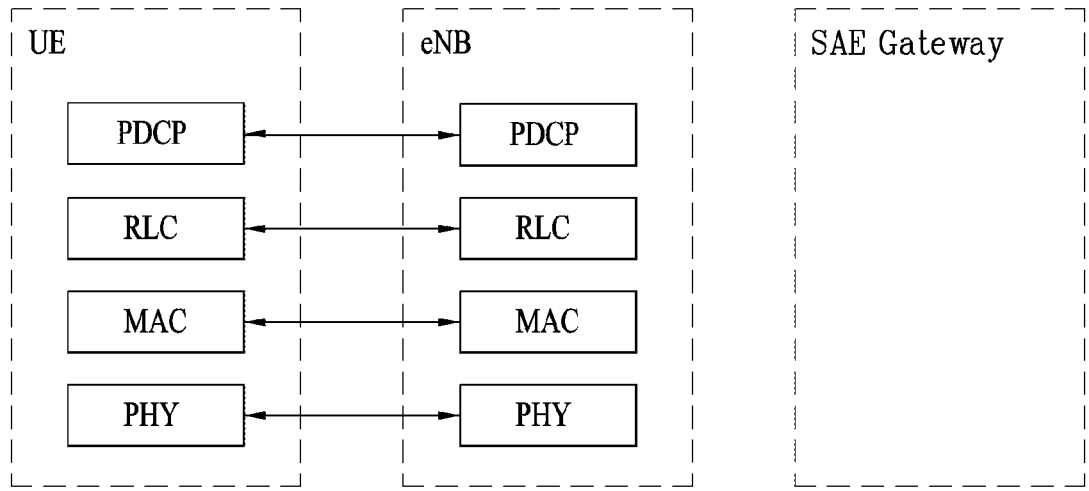

FIGS. 2A and 2B illustrate an example of control-plane and user-plane protocol stacks in a radio interface protocol architecture between a user equipment (UE) and a radio access network. In some scenarios, this example may conform to a 3GPP wireless access network standard between a UE and an evolved UMTS terrestrial radio access network (E-UTRAN).

For example, the control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in an "RRC Connected" mode and otherwise, the UE is in an "RRC Idle" mode. A non-access stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), a multicast traffic channel (MTCH), etc.

Figure 3:
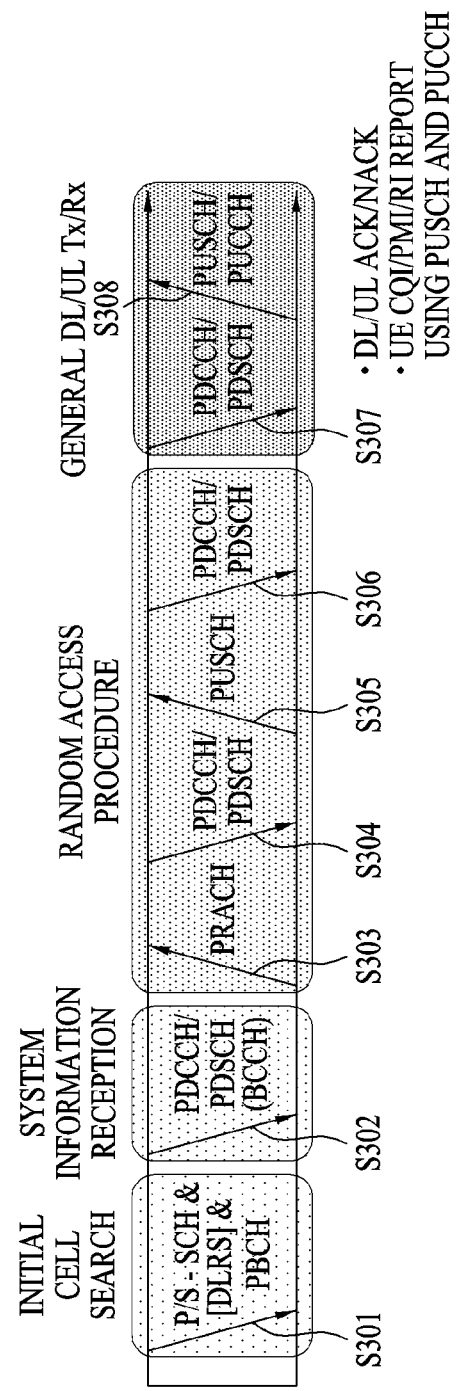
FIG. 3 illustrates an example of physical channels and signal transmission using the physical channels in a 3GPP system.

FIG. 3 illustrates examples of physical channels and transmitting signals on the physical channels in a 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a physical random access channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a physical uplink shared channel (PUSCH) and/or a physical uplink control channel (PUCCH) to the eNB (S308), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 4:
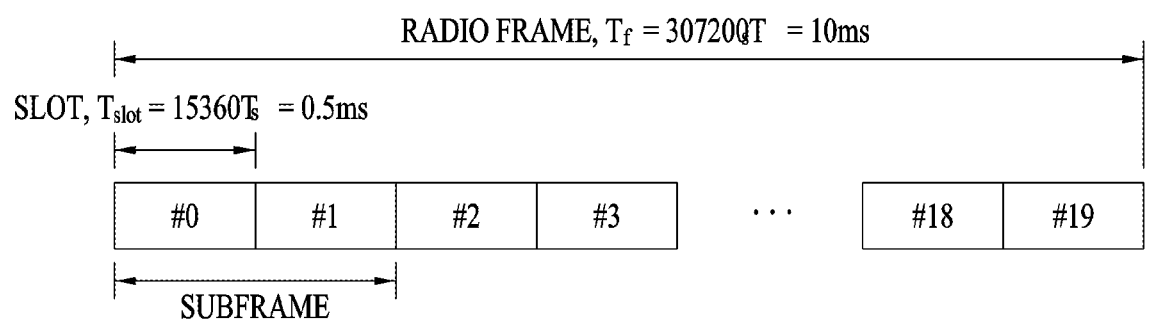
FIG. 4 illustrates an example of a structure of a radio frame.

FIG. 4 illustrates an example of a structure of a radio frame. In some scenarios, such implementations may be compatible with an LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s$=1/(15 kHz×2048)=3.2552×$10^8$ (about 33 ns). A slot includes a plurality of orthogonal frequency division multiplexing (OFDM) symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is merely exemplary and thus the number of subframes in a radio frame, the number of slots in a subframe, or the number of OFDM symbols in a slot may vary.

Figure 5:
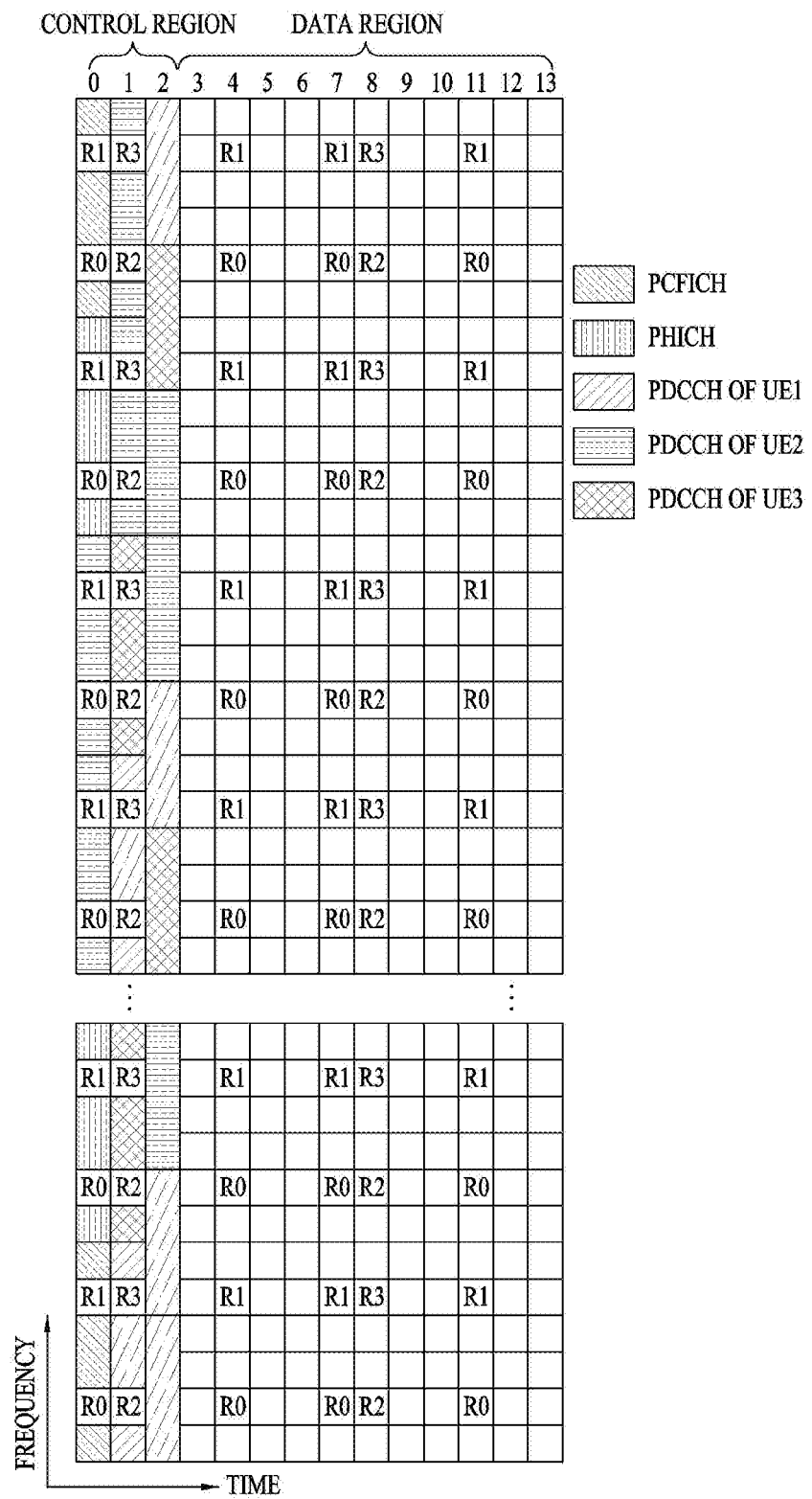
FIG. 5 illustrates an example of a structure of a downlink radio frame.

FIG. 5 illustrates examples of control channels included in a control region of a subframe in a DL radio frame. In some scenarios, such implementations may be compatible with an LTE system.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3.

RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-ARQ indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 resource element groups (REGs), each REG being distributed to the control region based on a cell identity (ID). One REG includes 4 resource elements (REs). An RE is a minimum physical resource defined by one subcarrier by one OFDM symbol. The PCFICH is set to 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is an integer greater than or equal to 1, and is indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, in scenarios where the cyclic redundancy check (CRC) of a specific PDCCH is masked by radio network temporary identity (RNTI) "A" and information about data transmitted in radio resources (e.g., at a frequency position) "B" based on transport format information (e.g., a transport block size, a modulation scheme, coding information, etc.) "C" is transmitted in a specific subframe, a UE within a cell monitors, e.g., blind-decodes, a PDCCH using its RNTI information in a search space. If one or more UEs have RNTI "A", then those UEs receive the PDCCH and receive a PDSCH indicated by "B" and "C" based on information of the received PDCCH.

Figure 6A:
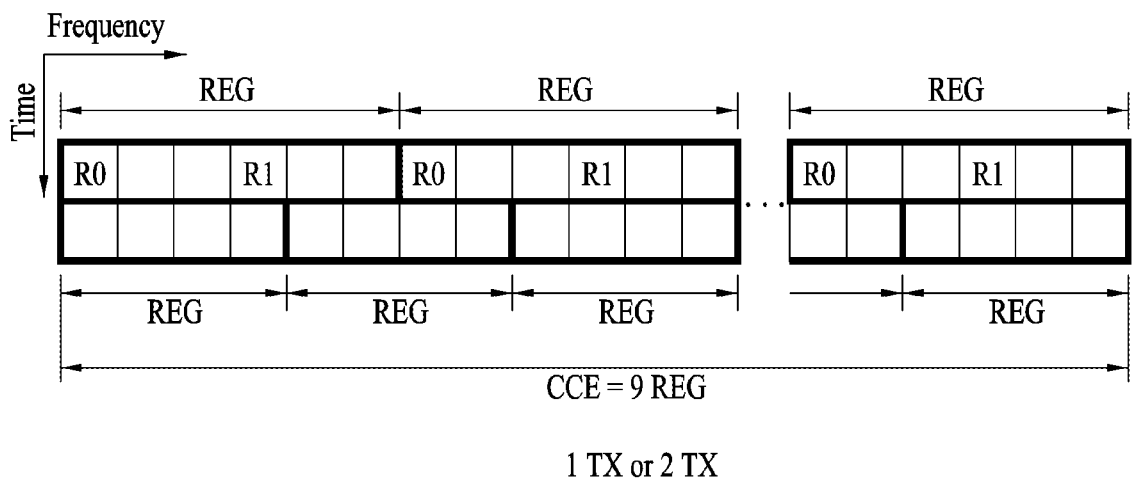
FIGS. 6A and 6B illustrate an example of resource units used to configure a downlink control channel.
Figure 6B:
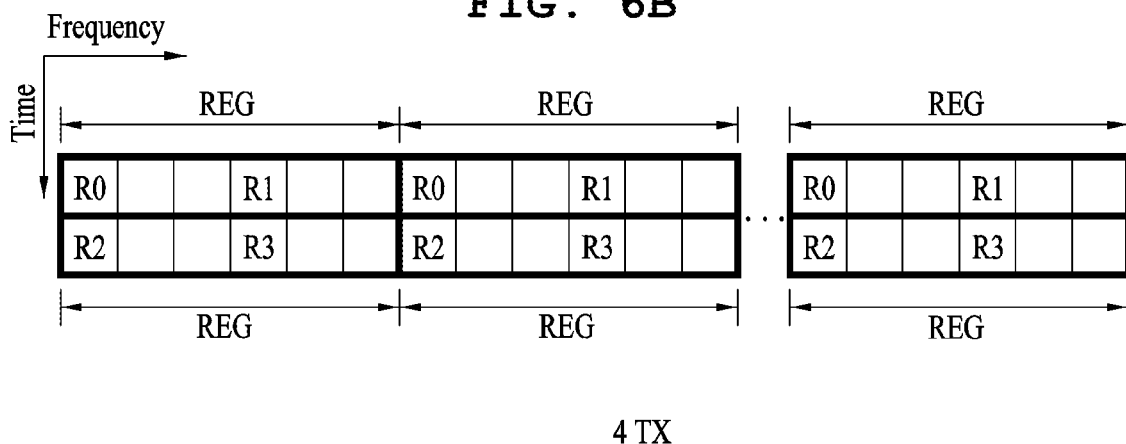

FIGS. 6A and 6B illustrate examples of resource units used to configure a downlink control channel. In some scenarios, such implementations may be compatible with an LTE system.

FIG. 6A shows a case in which the number of transmit (Tx) antennas is 1 or 2 and FIG. 6B shows a case in which the number of Tx antenna is 4. Although a different RS pattern is used according to the number of Tx antennas, REs are configured for a DL control channel in the same manner.

Referring to FIGS. 6A and 6B, a basic resource unit of a DL control channel is an REG. The REG includes four contiguous REs except for REs carrying RSs. REGs are delineated with bold lines in FIGS. 6A and 6B. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. The value of L that the UE should consider for PDCCH reception may be a plural value. The CCE sets that the UE should monitor to receive a PDCCH are referred to as a search space. As an example, a system that is compatible with LTE may define search spaces as illustrated in Table 1, below.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the example of Table 1, the parameter L is a CCE aggregation level, that is, the number of CCEs in a PDCCH, the parameter $S_k^{(L)}$ is a search space with CCE aggregation level L, and the parameter $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
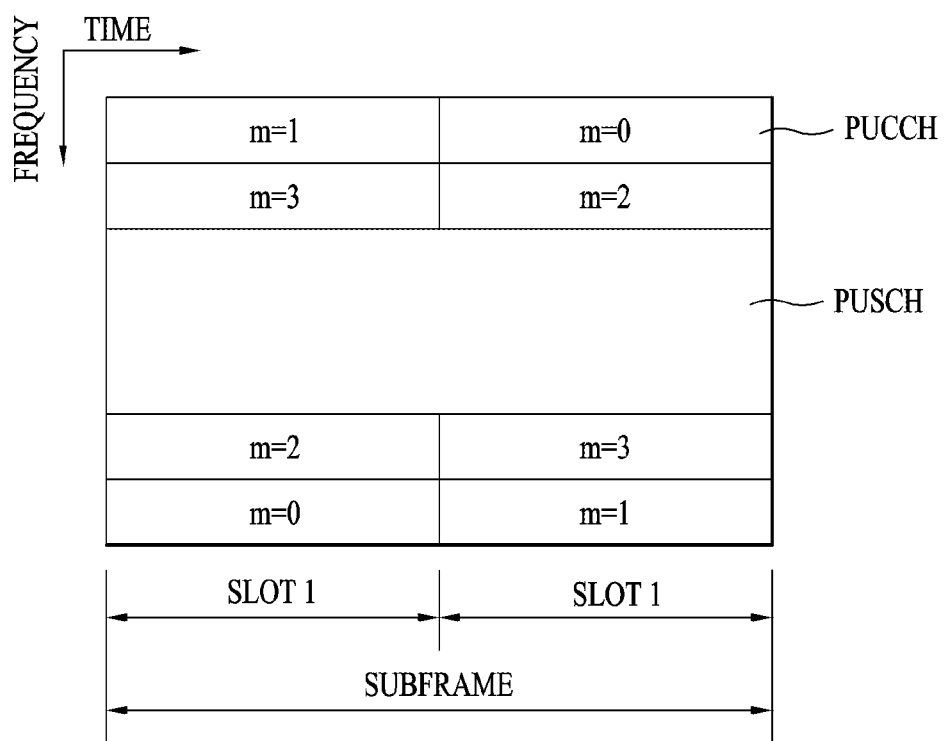
FIG. 7 illustrates an example of a structure of an uplink subframe.

FIG. 7 illustrates an example of a structure of a UL subframe. In some scenarios, such implementations may be compatible with an LTE system.

Referring to FIG. 7, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in the example of FIG. 7.

Transmission Mode 10 (TM 10): Coordinated Multi-Point (CoMP)

In some systems, for example those that are designed to satisfy requirements for enhanced system performance of 3GPP LTE-A, coordinated multi-point (CoMP) transmission and reception technology (also called co-MIMO, collaborative MIMO or network MIMO) may be implemented. In some scenarios, CoMP technology may increase the performance of UEs located at a cell edge, and improve the average sector throughput.

In a multi-cell environment with a frequency reuse factor of 1, the performance of a UE located at a cell edge and the average sector throughput may be lowered due to inter-cell interference (ICI). To attenuate ICI, some systems (e.g., those that are compatible with legacy LTE) may implement a simple passive technique such as fractional frequency reuse (FFR), based on UE-specific power control. In such systems, a UE located at a cell edge may have appropriate throughput in an environment constrained by interference. However, in some scenarios, attenuating the ICI or reusing ICI as a desired signal for the UE may be preferable to lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). For example, a plurality of points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. For example, one point transmits data to a single UE at a given time, while the other points in the CoMP cooperation unit do not transmit data to the UE at the given time. A point to transmit data to a UE may be dynamically selected.

In the CS/CB scheme, CoMP cooperation units may cooperatively perform beamforming for data transmission to a single UE. Herein, user scheduling/beamforming may be determined through coordination among cells of a CoMP cooperation unit, whereas data is transmitted to the UE only from a serving cell.

In the case of UL, CoMP reception refers to reception of a signal transmitted through cooperation among a plurality of geographically separated points. The CoMP schemes applicable to uplink may be classified into joint reception (JR) and coordinated scheduling/coordinated beamforming (CS/CB).

The JR scheme indicates that a plurality of reception points receives a signal transmitted through a PUSCH. The CS/CB scheme indicates that a PUSCH is received by only one point, but user scheduling/beamforming is determined by coordination among the cells of a CoMP unit.

With the CoMP system as above, multi-cell base stations may jointly support data for a UE. In some implementations, the base stations may simultaneously support one or more UEs using the same radio frequency resources, thereby increasing system performance. Moreover, a base station may perform space division multiple access (SDMA) based on CSI between the UE and the base station.

In some implementations of the CoMP system, a serving eNB and one or more cooperative eNBs are connected to a scheduler over a backbone network. The scheduler may receive channel information about the channel states between each UE and cooperative eNBs. The channel information about the channel states may be measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly issue a command about the cooperative MIMO operation to each eNB.

As described above, the CoMP system may operate as a virtual MIMO system by grouping a plurality of cells into one group. Basically, the CoMP system may adopt a MIMO communication scheme employing multiple antennas.

CoMP (TM 10) and CSI Process

Figure 8:
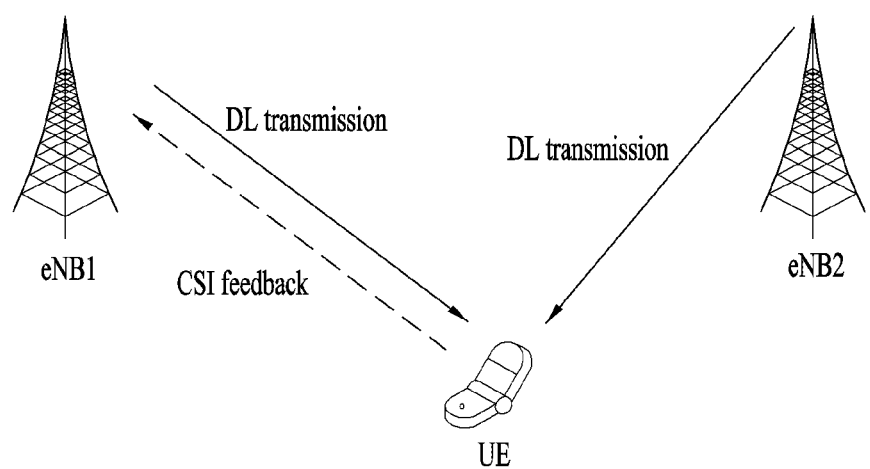
FIG. 8 illustrates an example of a DL operation configured to transmission mode 10 (TM 10)

FIG. 8 illustrates an example of DL CoMP (transmission mode TM 10) operation.

In FIG. 8, a UE is positioned between eNB1 and eNB2. The two eNBs, i.e., eNB1 and eNB2, perform a proper CoMP operation such as joint transmission (JT), dynamic cell selection (DCS), or CS/CB to mitigate interference to the UE. To aid in the CoMP operation of the eNBs, the UE performs proper CSI feedback. Information transmitted through CSI feedback includes RI, PMI and CQI of each eNB and may additionally include channel information between the two eNBs (e.g., phase offset information between a channel from eNB1 to the UE and a channel from eNB2 to the UE) for JT.

While the example of FIG. 8 illustrates the UE transmitting a CSI feedback signal to eNB1 which is the serving cell thereof, in some implementations the UE may transmit the CSI feedback signal to the eNB2 or to both eNBs depending on the situation.

For example, to support CoMP scheduling in a network, the UE may feedback not only DL CSI of a serving eNB/TP but also DL CSI of a neighboring eNB/TP. To this end, the UE may generate and feedback CSI about a plurality of CSI processes reflecting various interference environments of eNBs/TPs for data transmission.

In some implementations, an interference measurement resource (IMR) is used to measure interference when CoMP CSI calculation is performed. One or more IMRs may be configured for a UE. Each IMR may be independently configured. For example, a period, subframe offset, and resource configuration (i.e., RE mapping location) may be independently set for each IMR, and information thereabout may be signaled from the network to the UE via a higher layer (e.g., an RRC layer).

A CSI-RS is used to measure a desired channel or signal for CoMP CSI calculation, according to some implementations. One or more CSI-RSs may be configured for a UE. Each of the CSI-RSs is independently configured. For example, a transmission period, subframe offset, resource configuration (i.e., RE mapping location), assumption on transmit power (i.e., parameter Pc), and the number of APs may be independently configured for each CSI-RS and may be signaled from the network to the UE via a higher layer (e.g., an RRC layer).

One CSI process is defined by an association (combination) between one CSI-RS resource for signal measurement and one IMR for interference measurement, from among the CSI-RSs and IMRs configured for the UE. The UE may feedback, to the network, CSI that is calculated or derived from different CSI processes according to the independent periods and subframe offsets. That is, each CSI process may have an independent CSI feedback configuration. The network may provide the UE with the information about the association (or combination) between a CSI-RS resource and an IMR and CSI feedback configuration through higher layer signaling (e.g., RRC signaling, etc.) according to each CSI process. For example, in FIG. 8, three CSI processes as shown in the example of Table 2 may be configured for the UE.

TABLE 2

| CSI process | SMR | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In the example of Table 2, CSI-RS 0 represents a CSI-RS received from eNB1, which is a serving eNB of the UE, and CSI-RS 1 represents a CSI-RS received from eNB2, which is a neighboring eNB participating in cooperation.

Table 3 below shows examples of configurations of the three IMRs of Table 2 (IMR 0, IMR 1, and IMR 2). In the example of Table 3, IMR 0 is set as a resource on which eNB1 performs muting (or transmission of a null signal), and eNB2 performs data transmission. The UE measures interference from eNBs except for eNB1 on IMR 0. In addition, IMR 1 is set as a resource on which eNB2 performs muting, and eNB1 performs data transmission. The UE measures interference from the eNBs except for eNB2 based on IMR 1. Furthermore, IMR 2 is set as a resource on which both eNB1 and eNB2 perform muting. The UE measures interference from eNBs except for eNB1 and eNB2 based on IMR 2.

TABLE 3

| IMR | eNB1 | eNB2 |
| --- | --- | --- |
| IMR 0 | muting | data transmission |
| IMR 1 | data transmission | muting |
| IMR 2 | muting | muting |

In the example of Table 2, CSI of CSI process 0 indicates optimum RI, PMI, and CQI given when data is received from eNB1. CSI of CSI process 1 indicates optimum RI, PMI, and CQI given when data is received from eNB2. CSI of CSI process 2 indicates optimum RI, PMI, and CQI given when data is received from eNB1 and there is no interference from eNB2.

Quasi Co-Location (QCL)

A QC or QCL (Quasi Co-Located) relationship can be explained in terms of a signal or channel.

If large-scale properties of a signal received through one antenna port can be inferred from another signal received through another antenna port, then the two antenna ports may be said to be QCL. Herein, the large-scale properties may include, for example, at least one of a delay spread, a Doppler shift, a frequency shift, an average received power, or received timing.

Alternatively, two antenna ports may be said to be QCL when large-scale properties of a channel over which a symbol on one antenna port is transmitted can be inferred from properties of a channel over which another symbol on the other antenna port is transmitted. Herein, the large-scale properties may include, for example, at least one of a delay spread, a Doppler spread, a Doppler shift, an average gain, or an average delay.

In this disclosure, definition of the term QC or QCL is not distinguished among the signals or channels described above.

The UE may assume that any two antenna ports having the QCL assumption established therebetween are co-located, even if the antenna ports are not actually co-located. For example, the UE may assume that two antenna ports having the QCL assumption established therebetween are at the same transmission point (TP), even if the two antenna ports are not actually at the same TP.

For example, a specific CSI-RS antenna port, a specific downlink DMRS antenna port, and a specific CRS antenna port may be configured to be QCL. This configuration may correspond to a case in which the specific CSI-RS antenna port, the specific downlink DMRS antenna port, and the specific CRS antenna port are from one serving cell.

Alternatively, a CSI-RS antenna port and a downlink DMRS antenna port may be configured to be QCL. For example, in a CoMP environment in which a plurality of TPs participate, the UE may not explicit aware of a TP from which a CSI-RS antenna port is actually transmitted. In this case, the UE may be informed that a specific CSI-RS antenna port and a specific DMRS antenna port are QCL. This may correspond to a case in which the specific CSI-RS antenna port and the specific DMRS antenna port are from a certain TP.

In this case, the UE may improve performance of channel estimation by using a DMRS, based on the information about large-scale properties of a channel acquired using a CSI-RS or a CRS. For example, the UE may perform an operation of attenuating interference of a channel that is estimated through the DMRS, using the delay spread of a channel estimated through the CSI-RS.

In some implementations, the UE may apply estimation results for one antenna port to perform channel estimation for another antenna port. For example, regarding delay spread and Doppler spread, the UE may apply estimation results of the power-delay-profile, the delay spread, and Doppler spectrum, as well as the Doppler spread for one antenna port to a Wiener filter which is used in performing channel estimation for another antenna port. As another example, regarding frequency shift and received timing, after the UE performs time and frequency synchronization for one antenna port, the UE may apply the same synchronization to demodulation on another antenna port. As yet another example, regarding average received power, the UE may average measurements of reference signal received power (RSRP) over two or more antenna ports.

For example, the UE may receive DL scheduling information through a specific DMRS-based DL-related DCI format over a PDCCH or over an enhanced-PDCCH (EPDCCH). In this case, the UE may perform channel estimation of a scheduled PDSCH through a configured DMRS sequence and then perform data demodulation. For example, if the UE can make a QCL assumption that a DMRS port configuration received from the DL scheduling information and a port for a specific RS (e.g., a specific CSI-RS, a specific CRS, a DL serving cell CRS of the UE, etc.) are QCL, then the UE may apply the estimates of the large-scale properties (such as the delay spread) that are estimated through the port for the specific RS to implementation of channel estimation through the DMRS port.

In some scenarios, this may improve performance of DMRS-based reception. In particular, the CSI-RS or CRS is a cell-specific signal that is transmitted over the full band in the frequency domain, and thus allows for more accurate recognition of large-scale properties of a channel, as compared with the DMRS. Particularly, the CRS is a reference signal that is broadcast with a relatively high density over the full band in every subframe as described above, and thus, generally, estimates of the large-scale properties of a channel may be more stably and accurately acquired from the CRS. On the other hand, the DMRS is UE-specifically transmitted only on specific scheduled RBs. Accordingly accuracy of estimates of the large-scale properties of a channel using the DMRS is generally worse than in the case of the CRS or the CSI-RS. In addition, even if a plurality of physical resource block groups (PBRGs) is scheduled for a UE, an effective channel that is received by the UE may change on a PRBG-by-PRBG basis, since a precoding matrix that the eNB uses for transmission may change on the PRBG-by-PRBG basis. Therefore, the accuracy of estimation may be lowered even if large-scale properties of a radio channel are estimated based on the DMRS over a wide band.

For antenna ports (APs) which are not QCL (non-quasi-co-located (NQC)), the UE cannot assume that the APs have the same large-scale properties. In this case, the UE may need to perform independent processing for each NQC AP regarding timing acquisition and tracking, frequency offset estimation and compensation, delay estimation, and Doppler estimation.

PDSCH Resource Mapping Parameters

Information indicating whether or not APs are QCL may be provided to the UE through DL control information (e.g., a PQI field of DCI format 2D (a PDSCH RE mapping and QCL indicator field)). As a specific example, parameter sets (e.g., a maximum of four parameter sets) for a QCL configuration may be preconfigured by a higher layer, and a specific one of the QCL parameter sets may be indicated through the PQI field of DCI format 2D.

In some implementations, to decode a PDSCH transmitted on APs #7 to #14 (i.e., UE-specific RS APs), at least one of QCL type A or QCL type B may be configured for the UE by a higher layer (according to, for example, higher layer parameter qcl-operation).

QCL type A may be an operation of the UE assuming that APs #0 to #3 (i.e., CRS APs), #7 to #14 (i.e., UE-specific RS APs) and #15 to #22 (i.e., CSI-RS AP) are QCL with respect to delay spread, Doppler spread, Doppler shift and average delay.

QCL type B may be an operation of the UE assuming that APs #15 to #22 (i.e., CSI-RS APs) corresponding to CSI-RS resource configurations identified by non-zero power (NZP) CSI-RS configuration information (qcl-CSI-RS-ConfigNZPId-r11) given by a higher layer and APs #7 to #14 (i.e., UE-specific RS APs) associated with PDSCH are QCL with respect to delay spread, Doppler spread, Doppler shift and average delay.

A UE that is set to QCL type B may determine PDSCH RE mapping using a parameter set indicated by the PQI field of DCI format 2D of the detected PDCCH/EPDCCH and may also determine PDSCH AP QCL. Table 4 below shows an example of the PQI field of DCI format 2D.

TABLE 4

| Value of the PQI field | Description |
| --- | --- |
| '00' | Parameter set 1 configured by a higher layer |
| '01' | Parameter set 2 configured by a higher layer |
| '10' | Parameter set 3 configured by a higher layer |
| '11' | Parameter set 4 configured by a higher layer |

Each parameter set for determining PDSCH RE mapping and PDSCH AP QCL configured by higher layer signaling may include at least one parameter of CRS port count information (crs-PortsCount-r11), CRS frequency shift information (crs-FreqShift-r11), multicast broadcast single frequency network (MBSFN) subframe configuration information (mbsfn-SubframeConfigList-r11), zero power channel state information-reference signal (ZP CSI-RS) configuration information (csi-RS-ConfigZPId-r111), a PDSCH start symbol value (pdsch-Start-r11) and non-zero power (NZP) CSI-RS configuration information (qcl-CSI-RS-ConfigNZPId-r11).

A UE that is set to QCL type B may decode PDSCH transmitted through AP #7 using parameter set 1 of Table 4, by which the UE detects a PDCCH/EPDCCH of DCI format 1A CRC-masked with C-RNTI.

In decoding the PDSCH scheduled according to PDCCH/EPDCCH of DCI format 1A, if the PDSCH is transmitted through APs #0 to #3 (i.e., CRS APs), the UE may determine PDSCH RE mapping using a ZP CSI-RS resource having the lowest index.

Antenna Port QCL for PDSCH

A UE may assume that APs #0 to #3 (i.e., CRS APs) of the serving cell are QCL with respect to delay spread, Doppler spread, Doppler shift, average gain and average delay.

The UE may assume that APs #7 to #14 (i.e., UE-specific RS APs) of the serving cell are QCL with respect to delay spread, Doppler spread, Doppler shift, average gain and average delay.

The UE may assume that APs #0 to #3 (i.e., CRS APs), #5 (i.e., UE-Specific RS APs defined in 3GPP LTE Release 8), #7 to #14 (i.e., UE-Specific RS APs defined after 3GPP LTE Release 9) and #15 to #22 (i.e., CSI-RS APs) are QCL with respect to Doppler shift, Doppler spread, average delay and average spread.

Next, a description will be given below of a method of transmitting and receiving a DL data channel according to some implementations the present disclosure.

In a next-generation communication system, methods of achieving very low latency and very high reliability in transmitting and receiving information are under consideration. For this purpose, a method of efficiently providing services having target quality of service (QoS) requirements by configuring various target QoS requirements such as latency and/or reliability, and performing a different operation according to each target QoS requirement is considered.

The present disclosure describes techniques for performing a transmission mode 10 (TM-10) operation, when an eNB repeatedly transmits DL data to a UE to achieve high reliability and low latency in a cellular communication system.

While an invention and/or an embodiment of the present disclosure may be regarded as a proposed technique, each combination of inventions and/or embodiments may also be regarded as a new technique. Further, a specific invention is limited to neither an embodiment set forth in the present disclosure nor a specific system. That is, a specific invention may be extended from an embodiment set forth in the present disclosure within the scope that a person skilled in the art could easily derive. Embodiments of the present disclosure are applicable to various communication systems including LTE, LTE-A, LTE-Pro, new radio access technology (NR), and Institute of Electrical and Electronics Engineers (IEEE).

Further, in the present disclosure, all parameters, operations, each combination of parameters and/or operations, whether a parameter and/or an operation is applied, and/or whether each combination of parameters and/or operations is applied may be indicated to a UE by an eNB through higher-layer signalling and/or physical-layer signalling, or may be predefined in the system.

Further, a description of different subframe types is applicable in the same manner to different TMs in the present disclosure. For example, the description is also applicable to a case in which the transmission modes of two subframes configured to be of the same subframe type are changed and thus different. Further, a TTI described herein may correspond to various TTI length units such as subslot, slot, and subframe.

A subslot and a slot may be referred to as a short TTI (sTTI). As such, an sTTI may include a subslot and a slot. The short TTI is defined as a TTI of a length shorter than a 1-ms DL-SCH and a 1-ms UL-SCH. Control channels supporting the short TTI, short PDCCH (sPDCCH) and short PUCCH (sPUCCH) are transmitted during a shorter duration than 1 ms. Herein, a slot is 0.5 ms in duration and thus may include 7 symbols. A subslot may include two or three symbols.

Further, an sTTI-based transmission may be performed on a slot basis in a TDD system, and an sTTI-based transmission may be performed on a slot basis and/or on a subslot basis in an FDD system.

Figure 9A:
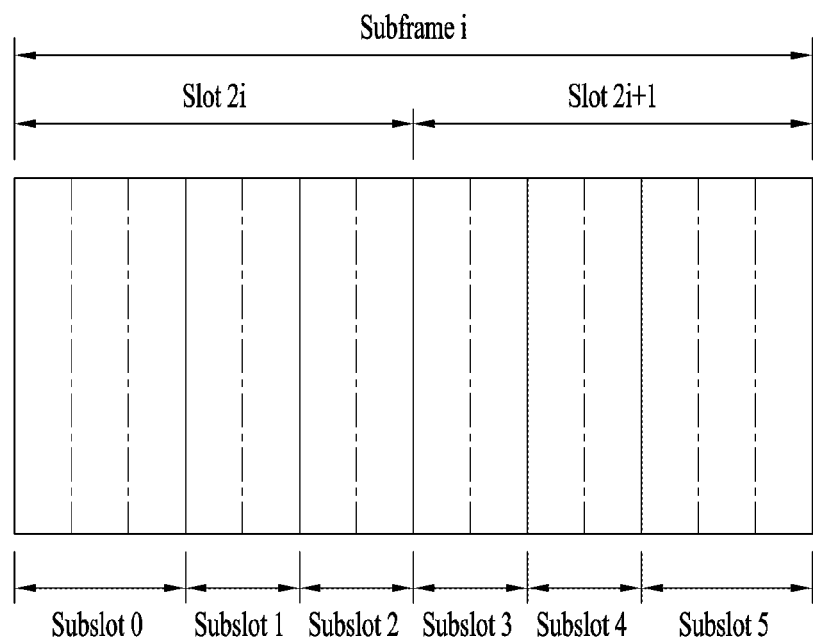
FIGS. 9A and 9B are diagrams illustrating an example of a structure of a short transmission time interval (TTI)

In some implementations, one subframe may include 6 subslots, and may have a different subslot arrangement pattern according to the number of symbols used for a PDCCH. Specifically, if the PDCCH occupies one or three symbols, each of subslot 0 and subslot 5 includes three symbols, and each of the remaining slots includes two symbols, as illustrated in FIG. 9A.

Figure 9B:
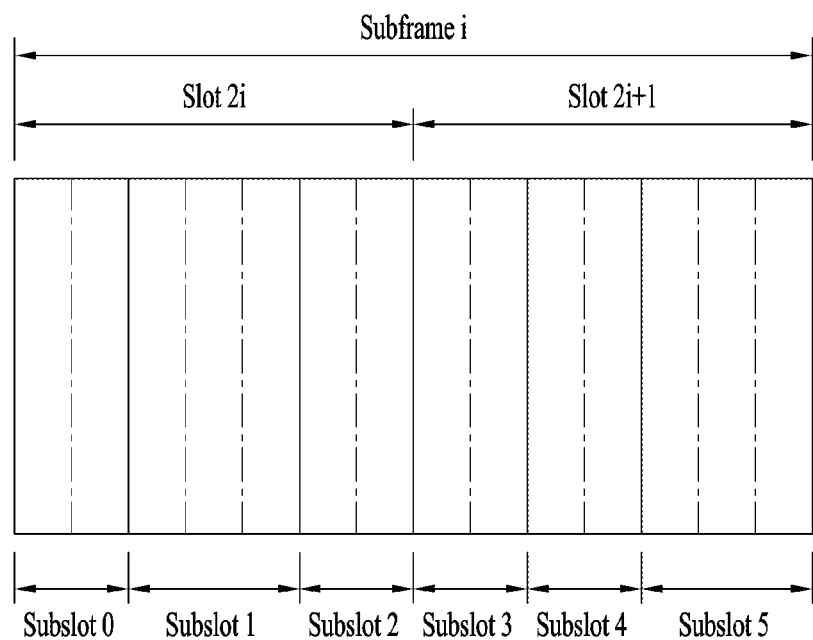

If the PDCCH occupies two symbols, each of subslot 1 and subslot 5 includes three symbols, and each of the remaining slots includes two symbols, as illustrated in FIG. 9B.

Figure 10A:
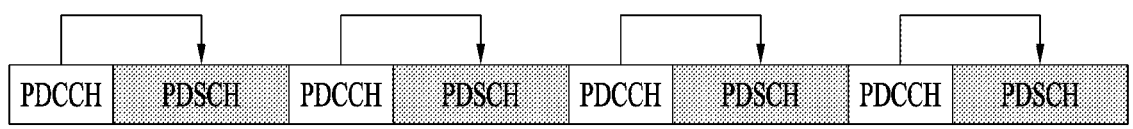
FIGS. 10A and 10B are diagrams illustrating an example of physical downlink shared channel (PDSCH) scheduling.

In some implementations, DL data may be repeatedly transmitted. This may increase the reliability of DL transmission in some scenarios. For example, as illustrated in the example of FIG. 10A, a control channel and a data channel scheduled by the control channel may be transmitted independently in each TTI. Herein, it may be indicated to a UE that data channels transmitted in a plurality of TTIs deliver the same transmission block (TB) by an HARQ process number, a new data indicator (NDI), and so on in each control channel, and the same data may be repeatedly transmitted in the plurality of TTIs.

Figure 10B:
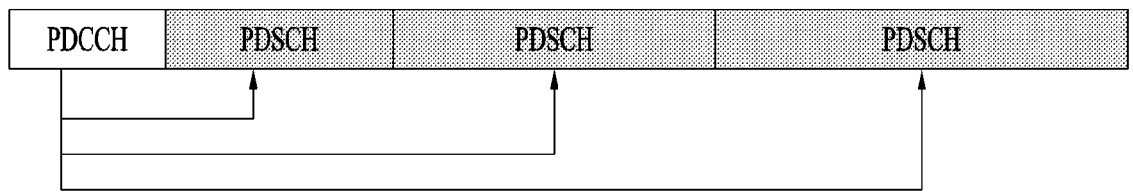

As another example, shown in FIG. 10B, a control channel that is transmitted in a single TTI may schedule data that is repeatedly transmitted in multiple TTIs. This may reduce the overhead of a control channel, as compared to the example of FIG. 10A. Therefore, in the example of FIG. 10B, a control channel transmitted in a single TTI may schedule data in multiple TTIs.

As such, a control channel may be transmitted in a plurality of TTIs. The number of TTIs in which the control channel is transmitted may be smaller than that of TTIs in which a data channel is transmitted. In some implementations, certain information in the DCI that schedules the repeated data transmissions may be commonly applied to the repeated data transmissions. For example, information such as a modulation coding scheme (MCS)/resource allocation (RA) in DCI that schedules repeated data transmissions in multiple TTIs may be applied commonly to all of the TTIs in which the data is repeatedly transmitted. Further, the DCI may include information about the repetition number of the data.

Further, if DCI transmitted in a specific TTI schedules repeated data transmissions in a plurality of TTIs including the specific TTI, information about the repetition number k of data may be transmitted in the DCI.

In some implementations, if the DCI is successfully decoded, then it may be configured that DCI decoding is not attempted in the remaining (k−1) consecutive (or non-consecutive) TTIs. Furthermore, even though DCI is detected by attempting DCI decoding in the remaining (k−1) consecutive (or non-consecutive) TTIs, the DCI may be discarded. The DCI which is not decoded or the DCI which is discarded may be DCI that is related to C-RNTI-based data scheduling or DL data scheduling. Further, the successfully decoded DCI may also be DCI related to C-RNTI-based data scheduling or DL data scheduling.

In some implementations, e.g., such as those compatible with the 3GPP TS 36.213 technical specification, a list of PDSCH RE mapping and PDSCH AP QCL-related information that is indicated by a 2-bit PDSCH Rate Matching and QuasCoLocation Indicator (PQI) field in DCI format 2D that is applied to TM 10 may be given below.

---

The following parameters for determining PDSCH RE mapping and PDSCH antenna port quasi co-location are configured via higher layer signaling for each parameter set for Type B quasi co-location and parameter set 1, 3, 5, 7 for Type C quasi co-location:

✓ crs-PortsCount-r11.
✓ crs-FreqShift-r11.
✓ mbsfn-SubframeConfigList-r11.
✓ csi-RS-ConfigZPId-r11
✓ pdsch-Start-r11.
✓ qcl-CSI-RS-ConfigNZPId-r11.
✓ zeroTxPowerCSI-RS2-r12 if the UE is configured with higher layer parameter eMIMO-Type for TDD serving cell.

---

The above information is configured in correspondence with states that may be indicated by the PQI field. In some implementations, an eNB indicates these states to a UE by RRC signaling. If different PQI states indicate different NZP CSI-RS information, this may be regarded as PDSCH transmissions of different transmission points (TPs). For example, if different PQI states are indicated, then these states may be intended for a CoMP dynamic TP switching operation.

Implementations disclosed herein address a need for applying the above PDSCH RE mapping information and/or PDSCH AP QCL-related information in the case where the afore-described repeated data transmission operation is applied in an environment in which TM 10 is configured. Particularly, when repeated data transmissions take place across the boundary between different subframes, it may be necessary to consider how to apply PDSCH RE mapping information and/or PDSCH AP QCL-related information to data that is transmitted in a TTI included in a subsequent subframe without DCI among the repeated data transmissions.

Figure 11:
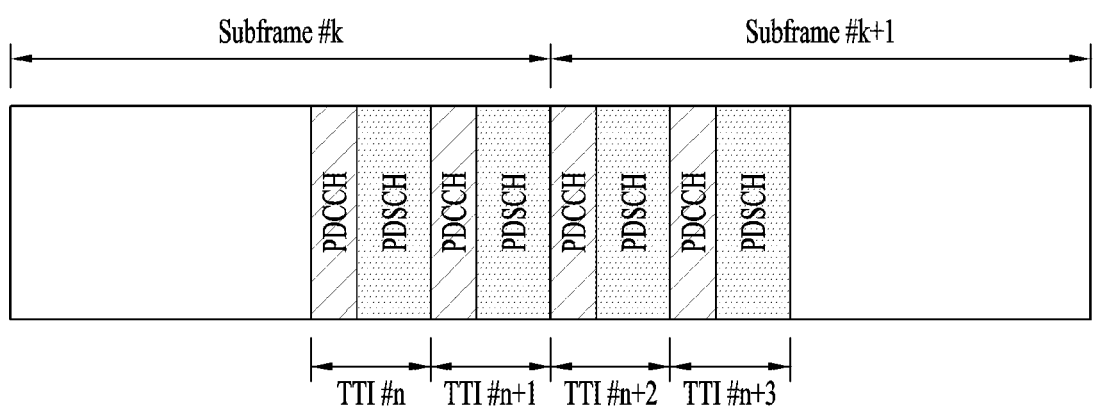
FIG. 11 is a diagram illustrating an example of repeated PDSCH transmissions according to an embodiment of the present disclosure.

FIG. 11 is a diagram illustrating an example of repeated PDSCH transmissions.

In this example, if a UE succeeds in detecting DCI in TTI #n, and the repetition number of data is set to 4 in the DCI, then DCI may be discarded in subsequent TTIs #(n+1), #(n+2), and #(n+3) in which data is repeatedly transmitted. If TTIs #n and #(n+1) are included in subframe #k, and TTIs #(n+2) and #(n+3) are included in subframe #(k+1) as illustrated in FIG. 11, then a PQI field in a DCI format detected in TTI #n of subframe #k may not provide the UE with ZP CSI-RS information for PDSCH rate-matching, applied to TTIs #(n+2) and #(n+3) of subframe #(k+1). Accordingly, there is a need for a technique of indicating correct PDSCH RE mapping information applied to TTIs #(n+2) and #(n+3) of subframe #(k+1).

When the presence or absence of an IMR, the presence or absence of a CSI-RS of an interference cell, and the like are different in subframes #k and #(k+1), it may be necessary to apply different ZP CSI-RS information to subframes #k and #(k+1).

Further, DCI that is detected in TTI #n and/or DCI that is discarded may be DCI related to C-RNTI-based data scheduling or DL data scheduling.

Figure 12:
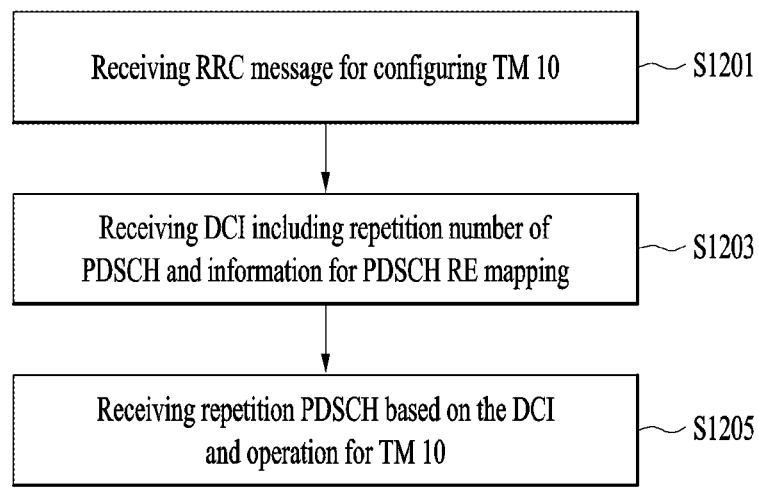
FIGS. 12, 13, and 14 are diagrams illustrating examples of operations of a UE, an evolved Node B (eNB), and a network according to the present disclosure.
Figure 13:
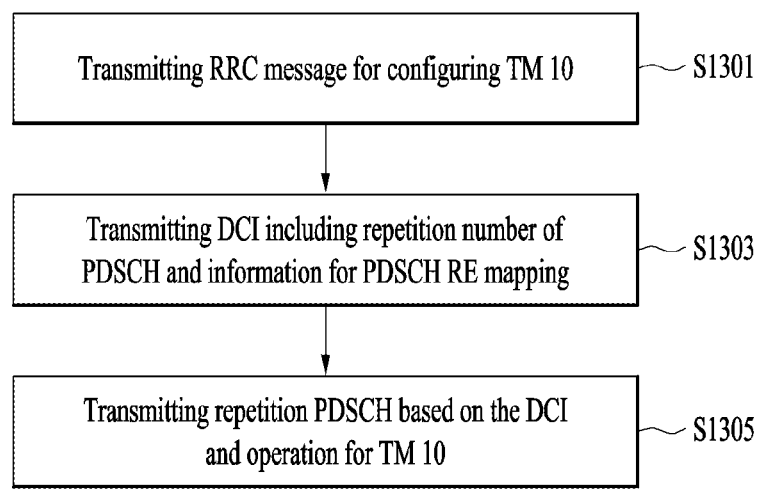
Figure 14:
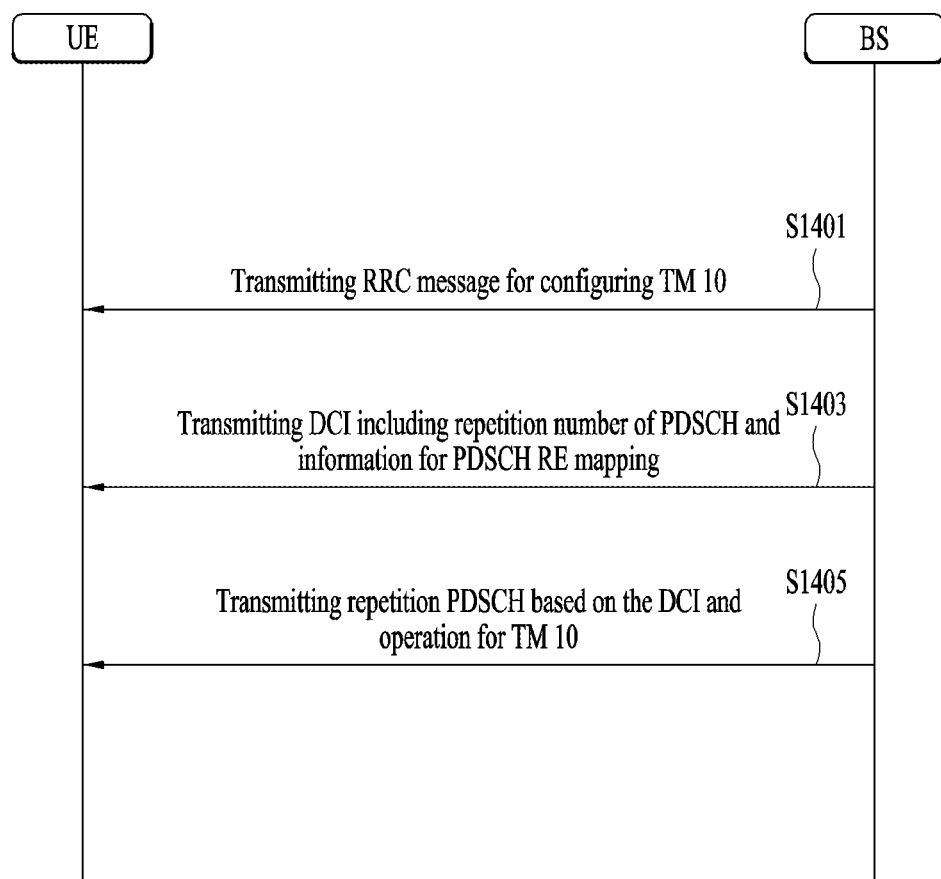

With reference to FIGS. 12, 13 and 14, examples of operations from the perspectives of a UE, an eNB, and a network according to embodiments of the present disclosure will be described below.

FIG. 12 is a flowchart illustrating an example of a UE operation according to embodiments of the present disclosure.

Referring to FIG. 12, a UE receives an RRC message for a TM-10 operation from an eNB through a higher layer (S1201). The UE detects DCI including PDSCH RE mapping information for TM 10 and a repetition number of data in a TTI included in a specific subframe (S1203).

The UE then receives repeatedly transmitted data based on the information included in the DCI and the TM-10 operation (S1205). Herein, a specific method of using the PDSCH mapping information included in the DCI according to TM 10 may be performed according to embodiments described further below.

Referring to FIG. 13 illustrating an eNB operation according to embodiments of the present disclosure, an eNB transmits an RRC message for a TM-10 operation to a UE through a higher layer (S1301). The eNB transmits DCI including PDSCH RE mapping information for TM 10 and a repetition number of data in a TTI included in a specific subframe (S1303).

The eNB then repeatedly transmits the data based on the information included in the DCI and the TM-10 operation (S1305). Herein, a specific method of using the PDSCH mapping information included in the DCI according to TM 10 may be performed according to embodiments described further below. Particularly, the eNB may consider the embodiments described below in performing and/or configuring the TM-10 operation or generating and/or configuring the information included in the DCI.

Referring to FIG. 14 illustrating an overall operation from the perspective of a network according to embodiments of the present disclosure, an eNB transmits an RRC message for a TM-10 operation to a UE through a higher layer (S1401). The eNB then transmits DCI including PDSCH RE mapping information for TM 10 and a repetition number of data in a TTI included in a specific subframe (S1403).

The eNB then repeatedly transmits the data based on the information included in the DCI and the TM-10 operation (S1405). Herein, a specific method of using the PDSCH mapping information included in the DCI according to TM 10 by the UE that has received the DCI may be performed according to embodiments described further below.

Further, the eNB may consider the embodiments described below in performing and/or configuring the TM-10 operation or generating and/or configuring the information included in the DCI.

Now, a description will be given of examples of implementations for indicating PDSCH RE mapping information applied to TTIs #(n+2) and #(n+3) included in subframe #(k+1).

When TM 10 is configured, a UE may always detect DCI in a DCI format corresponding to the transmission mode in a part of TTIs configured for repeated data transmissions, included in a subframe following a subframe boundary (e.g., in the first TTI of the following subframe, such as TTI #(n+2) as shown in the example of FIG. 11). In particular, the UE may attempt to decode the DCI, and may attempt to decode the repeatedly transmitted data by applying a PDSCH rate-matching pattern for the subframe, based on the detected DCI. This may be an exception to the operation of attempting no DCI decoding or discarding DCI which has been detected by a decoding attempt, in a TTI following a specific TTI in which DCI scheduling repeatedly transmitted data is detected. As described before, DCI for which detection is attempted in some TTI of the following subframe may be DCI related to C-RNTI-based data scheduling.

In some implementations, the UE may be configured to attempt to decode DCI in some of TTIs in which data is repeatedly transmitted, included in a subframe following a subframe boundary (e.g., the first TTI of the following subframe, such as TTI #(n+2) in FIG. 11). However, the UE may follow only part of the DCI. In the information of the DCI detected in some TTI, for example, the UE uses only information included in a PQI field to receive data repeatedly transmitted in the following subframe. The UE may use information included in the DCI detected in the TTI of the previous frame in place of information of the other fields, to receive the data repeatedly transmitted in the following subframe. In such implementations only information included in a PQI field in the information included in the DCI detected in the TTI of the previous subframe is replaced with the information included in the DCI detected in some TTI of the following subframe, for receiving the repeatedly transmitted data.

In some implementations, the UE may derive a PDSCH rate-matching pattern applied to subframe #(k+1) on the assumption of the union between PDSCH RE mapping information (e.g., csi-RS-ConfigZPId) corresponding to a state indicated by the PQI field in the successfully decoded DCI and PDSCH RE mapping information (e.g., csi-RS-ConfigZPId) linked to a state having the same qcl-CSI-RS-ConfigNZPId as qcl-CSI-RS-ConfigNZPId corresponding to the state indicated by the PQI field.

For example, if there are two states having the same qcl-CSI-RS-ConfigNZPId, and the two states are linked to ZP CSI-RS configurations #1 and #2, respectively, then a PDSCH rate-matching pattern applied to subframe #(k+1) may be derived from the union between the configurations, that is, ZP CSI-RS configurations #1 and #2. Further, when data is repeatedly transmitted, information corresponding to the union may be applied to all of the repeated transmissions. That is, the information corresponding to the union may be applied to all TTIs in which the data is repeatedly transmitted.

Otherwise, the PDSCH RE mapping information corresponding to the state indicated by the PQI field in the successfully decoded DCI may be applied only to TTIs included in the subframe in which the DCI has been decoded (i.e., the previous subframe), and the information corresponding to the union may be applied only to TTIs included in the following subframe, among the repeated data transmissions scheduled by the DCI.

Aside from the foregoing embodiments, once DCI indicating repeated data transmissions is successfully decoded, the PDSCH RE mapping information included in the decoded DCI may be applied to all of the repeated data transmissions. For example, if repeated transmissions are configured across different subframes, then PDSCH RE mapping information indicated in DCI that is detected in a TTI of subframe #k may be used as PDSCH RE mapping information applied to TTIs of subframe #(k+1), among TTIs for the repeated data transmissions. In other words, the UE may not expect that the PDSCH rate-matching pattern will be changed during the repeated data transmissions. As such, the UE may perform PDSCH decoding under the assumption that the same rate-matching, based on information included in the PQI field of the DCI indicating the repeated data transmissions, is applied to all TTIs in which data is repeatedly transmitted.

In this case, if DCI for repeated transmissions is detected, then there may not be a need for defining an exception to the operation of detecting no DCI or discarding DCI in TTIs for the repeated data transmissions. In other words, the UE has only to perform the same operation to detect DCI for repeated data transmissions irrespective of a TM configured for the UE, thereby mitigating ambiguity. Particularly, in scenarios where TM 10 is implemented in the same manner as in other embodiments disclosed herein, if the same TP transmits subframes in which repeated data transmissions take place, then the UE may not need to detect additional DCI, once the UE succeeds in detecting DCI. If subframes in which repeated data transmissions take place are transmitted by different TPs, then the UE may need to additionally detect DCI. In fact, the UE is not aware of a TP that transmits each subframe, and thus confusion may arise in regards to determining whether additional DCI detection is needed.

Accordingly, to reduce confusion in the UE operation, the UE may be configured not to expect that a PDSCH rate-matching pattern will be changed during repeated data transmissions, which may be effective.

Aside from these embodiments, PDSCH RE mapping information for application to repeated data transmissions or for application to repeated data transmissions across different subframes may be predefined in the system, or may be indicated to the UE by the eNB through higher-layer signaling and/or physical-layer signaling.

The PDSCH RE mapping information which has been predefined or signaled to the UE by the eNB may be applied to all of the repeated data transmissions, or only to a TTI included in a following subframe among TTIs in which data is repeated transmitted, when the repeated transmissions take place across different subframes.

The configurable PDSCH RE mapping information may be PDSCH RE mapping information based on the assumption of the worst case such as all configurable IMRs, a CSI-RS of an interference cell, or the like.

Further, for application to subframe #(k+1), a PDSCH rate-matching pattern may be predefined for each qcl-CSI-RS-ConfigNZPId, and the eNB may indicate a PDSCH rate-matching pattern to the UE by higher-layer signaling and/or physical layer signaling. Further, for application to subframe #(k+1), a PDSCH rate-matching pattern may be predefined for each PQI state, and the eNB may indicate a PDSCH rate-matching pattern to the UE by higher-layer signaling and/or physical layer signaling.

A PQI state corresponding to a PDSCH rate-matching pattern applied to subframe #(k+1) may correspond to a state indicated by the PQI field of successfully decoded DCI.

In relation to repeated data transmissions, whether data is to be repeatedly transmitted only in a single subframe type and/or a single subframe or across different subframe types and/or different subframes according to a configured transmission mode may be predefined in the system or may be indicated to the UE by the eNB through higher-layer signaling and/or physical layer signaling.

For example, in scenarios where TM 10 is configured, it may be predefined in the system or indicated to the UE by the eNB through higher-layer signaling and/or physical layer signaling that data is to be repeatedly transmitted only in a single subframe type and/or a single subframe.

When repeated data transmissions are performed, each repeated data transmission may be from a different TP, and repeated transmissions of the same data may be limited to the same TP. In other words, if the UE is indicated to receive repeated transmissions of the same data, then the UE may not expect that the repeated transmissions are from different TPs. If repeatedly transmitted data is from different TPs, then the eNB may provide the UE with PDSCH RE mapping information of each TP by higher-layer signaling and/or physical-layer signaling.

Otherwise, the UE may operate on the assumption of the worst case of PDSCH RE mapping. For example, the eNB may indicate an MBSFN subframe configuration for each TP or a CSI-RS linked to each TP to the UE by higher-layer signaling and/or physical-layer signaling, and the UE may apply PDSCH RE mapping on the assumption of the worst case such as the existence of non-MBSFN subframes all the time. The eNB may transmit information indicating a TP that transmits each repeated transmission along with the above information to the UE by higher-layer signaling and/or physical-layer signaling.

Further, a sequence or pattern of PQI states applied to respective repeated data transmissions that take place across multiple TTIs may be predefined in the system or may be indicated to the UE by the eNB through higher-layer signaling and/or physical-layer signaling. Further, candidates for a sequence or pattern of PQI states applicable to repeated data transmissions that take place across multiple TTIs may be predefined in the system or indicated to the UE by the eNB through higher-layer signaling and/or physical-layer signaling, and a sequence candidate or pattern candidate for a PQI state applied to each TTI may be indicated by a DCI field at a corresponding repeated data transmission. Herein, a legacy PQI field may be reused or a new field may be defined as the field indicating a sequence candidate or pattern candidate for a PQI state applied to each TTI.

Figure 15:
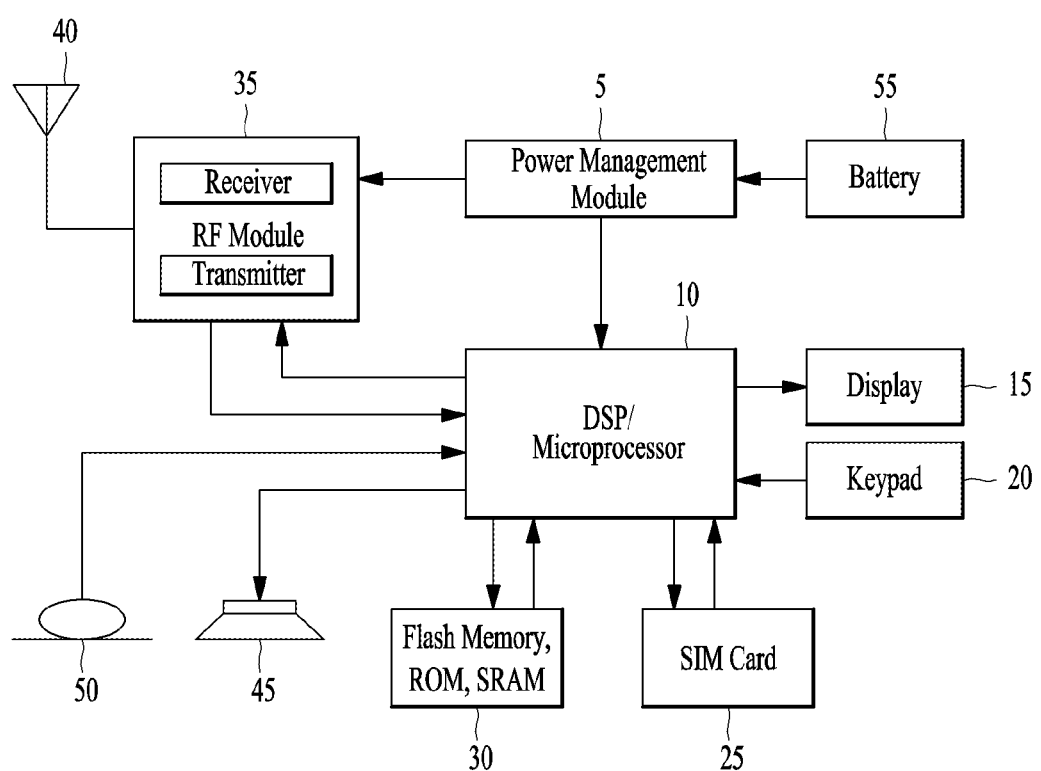
FIG. 15 is a block diagram of an example of wireless devices for implementing the present disclosure.

FIG. 15 shows an example of a radio communication apparatus according to some implementations of the present disclosure.

The wireless communication apparatus illustrated in FIG. 15 may represent a user equipment (UE) and/or a base station according to an implementation of the present disclosure. However, the wireless communication apparatus of FIG. 15 is not necessarily limited to the UE and/or the base station according to the present disclosure, and may implement various types of apparatuses, such as a vehicle communication system or apparatus, a wearable apparatus, a laptop, etc.

In the example of FIG. 15, a UE and/or a base station according to implementations of the present disclosure includes at least one processor, such as processor 10, which may include, for example, a digital signal processor or a microprocessor. The UE and/or base station also includes a transceiver 35, a power management module 5, an antenna 40, a battery 55, a display 15, a keypad 20, at least one memory 30, a subscriber identity module (SIM) card 25, a speaker 45, and a microphone 50, and the like. The UE and/or the base station may include a single antenna or multiple antennas. The transceiver 35 may be also referred to as an RF module.

The at least one processor 10 may be configured to implement the functions, procedures and/or methods described in FIGS. 1 to 14. In at least some of the implementations described in FIGS. 1 to 14, the at least one processor 10 may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the UE and/or base station such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna 40 facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the UE and/or the base station. For example, a camera may be further connected to the at least one processor 10, which may be used for a variety of services such as autonomous navigation, vehicle safety services, and the like.

FIG. 15 merely illustrates one example of an apparatuses constituting the UE and/or the base station, and the present disclosure is not limited thereto. For example, some components, such as keypad 20, global positioning system (GPS) chip, sensor, speaker 45 and/or microphone 50 may be excluded for UE and/or base station implementations in some implementations.

Specifically, an operation of a UE as the wireless communication devices illustrated in FIG. 15 to implement the embodiments of the present disclosure will be described. If the wireless communication device is a UE according to an embodiment of the present disclosure, the processor 10 may control the transceiver 35 to receive an RRC message for a TM-10 operation from an eNB through a higher layer. The processor 10 may detect DCI including PDSCH RE mapping information for TM 10 and a repetition number of data in a TTI included in a specific subframe.

The processor 10 controls the transceiver 35 to receive repeatedly transmitted data based on the information included in the DCI and the TM-10 operation. Herein, a specific method of using the PDSCH mapping information included in the DCI according to TM 10 may be performed according to the embodiments described before with reference to FIGS. 1 to 14.

Specifically, an operation of an eNB as the wireless communication devices illustrated in FIG. 15 to implement the embodiments of the present disclosure will be described. If the wireless communication device is an eNB according to an embodiment of the present disclosure, the processor 10 controls the transceiver 35 to transmit an RRC message for a TM-10 operation to a UE through a higher layer. The processor 10 controls the transceiver 35 to transmit DCI including PDSCH RE mapping information for TM 10 and a repetition number of data in a TTI included in a specific subframe.

The processor 10 controls the transceiver 35 to repeatedly transmit data based on the information included in the DCI and the TM-10 operation. Herein, a specific method of using the PDSCH mapping information included in the DCI according to TM 10 may be performed according to the embodiments described before with reference to FIGS. 1 to 14.

Particularly, the processor 10 of the eNB may consider the foregoing embodiments described before with reference to FIGS. 1 to 14 in performing and/or configuring the TM-10 operation, or generating and/or configuring information included in the DCI.

As is apparent from the foregoing description, according to the present disclosure, DL data may be transmitted repeatedly with high reliability and low latency, even when a TM-10 operation is performed.

While the method and apparatus for transmitting and receiving a DL data channel have been described in the context of a 3GPP LTE system, by way of example, they are applicable to various wireless communication systems other than the 3GPP LTE system.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a UE in a network including a plurality of network nodes including a base station can be performed by the base station or by a network node other than the base station. A base station may be replaced by terms such as a fixed station, a Node B, an eNode B (eNB), an access point, and the like.

Implementations according to the present disclosure may be implemented by various means, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

What is claimed is:

1. A method of receiving, by a user equipment (UE) configured to operate in transmission mode 10, Physical Downlink Shared Channel (PDSCH) in a wireless communication system, the method comprising:
   receiving, in a short transmission time interval (sTTI), downlink control information (DCI) that comprises Quasi Co-Location Indicator (PQI) information related to PDSCH resource element (RE) mapping and PDSCH antenna port Quasi Co-location (QCL) for the sTTI; and
   receiving, in the sTTI and at least one sTTI subsequent to the sTTI, repeated transmissions of the PDSCH based on the PQI information,
   wherein the PQI information is commonly used for the sTTI and all of the at least one sTTI.

2. The method of claim 1, further comprising:
   decoding the repeated transmissions of the PDSCH based on the PQI information.

3. The method according to claim 1, wherein receiving the repeated transmissions of the PDSCH comprises:
   receiving the PDSCH which is repeatedly transmitted in the sTTI and the at least one sTTI from a same transmission point (TP).

4. The method according to claim 1, wherein the sTTI is included in a first subframe and at least part of the at least one sTTI is included in a second subframe, and
   wherein the first subframe is located immediately before the second subframe.

5. The method according to claim 1, wherein the DCI is related to cell-radio network temporary identifier (C-RNTI)-based data scheduling.

6. The method according to claim 1, wherein the sTTI and the at least one sTTI are consecutive in time.

7. An apparatus configured to operate in transmission mode 10, the apparatus comprising:
   at least one processor; and
   at least one memory operably connectable to the at least one processor and storing instructions that, when executed by the at least one processor, perform operations for receiving a Physical Downlink Shared Channel (PDSCH), the operations comprising:
   receiving, in a short transmission time interval (sTTI), downlink control information (DCI) that comprises QuasiCoLocation Indicator (POI) information related to PDSCH resource element (RE) mapping and PDSCH antenna port Quasi Co-location (QCL) for the sTTI; and
   receiving, in the sTTI and at least one sTTI subsequent to the sTTI, repeated transmissions of the PDSCH based on the PQI information,
   wherein the PQI information is commonly used for the sTTI and all of the at least one sTTI.

8. The apparatus of claim 7, wherein the operations further comprise:
   decoding the repeated transmissions of the PDSCH based on the PQI information.

9. The apparatus according to claim 7, wherein receiving the repeated transmissions of the PDSCH comprises:
   receiving the PDSCH which is repeatedly transmitted in the sTTI and the at least one sTTI from a same transmission point (TP).

10. The apparatus according to claim 7, wherein the sTTI is included in a first subframe and at least part of the at least one sTTI is included in a second subframe, and
    wherein the first subframe is located immediately before the second subframe.

11. The apparatus according to claim 7, wherein the DCI is related to cell-radio network temporary identifier (C-RNTI)-based data scheduling.

12. The apparatus according to claim 7, wherein the sTTI and the at least one sTTI are consecutive in time.

13. A method of transmitting downlink data by a base station (BS) operating based on transmission mode 10 in a wireless communication system, the method comprising:

transmitting, in a short transmission time interval (sTTI), downlink control information (DCI) that comprises PQI information related to PDSCH resource element (RE) mapping and PDSCH antenna port Quasi Co-location (QCL) for the sTTI; and transmitting, in the sTTI and at least one sTTI subsequent to the sTTI, repeated transmissions of the PDSCH based on the PQI information, wherein the PQI information is commonly used for the sTTI and all of the at least one sTTI.

14. A user equipment (UE) configured to operate in transmission mode 10, the UE comprising:

at least one transceiver;

at least one processor; and at least one computer memory operably connectable to the at least one processor and storing instructions that, when executed by the at least one processor, perform operations for receiving a Physical Downlink Shared Channel (PDSCH), the operations comprising:

receiving, through the at least one transceiver and in a short transmission time interval sTTI, downlink control information (DCI) that comprises QuasiCoLocation Indicator (PQI) information related to PDSCH resource element (RE) mapping and PDSCH antenna port Quasi Co-location (QCL) for the sTTI; and receiving, through the at least one transceiver and in the sTTI and at least one sTTI subsequent to the sTTI, repeated transmissions of the PDSCH based on the PQI information, wherein the PQI information is commonly used for the sTTI and all of the at least one sTTI.

15. A base station (BS) configured to operate based on transmission mode 10, the BS comprising:

at least one transceiver; and at least one processor; and at least one computer memory operably connectable to the at least one processor and storing instructions that, when executed by the at least one processor, perform operations comprising:

transmitting, through the at least one transceiver and in a short transmission time interval sTTI, downlink control information (DCI) that comprises QuasiCoLocation Indicator (POI) information related to PDSCH resource element (RE) mapping and PDSCH antenna port Quasi Co-location (QCL) for the sTTI; and transmitting, through the at least one transceiver and in the sTTI and at least one sTTI subsequent to the sTTI, repeated transmissions the PDSCH based on the PQI information, wherein the PQI information is commonly used for the sTTI and all of the at least one sTTI.

* * * * *